US012610963B2

(12) United States Patent
Wright et al.

(10) Patent No.: US 12,610,963 B2
(45) Date of Patent: Apr. 28, 2026

(54) CONFECTIONARY DEMOLDING DEVICE AND PROCESS

(71) Applicant: Schenck Process LLC, Kansas City, MO (US)

(72) Inventors: Tyler Wright, Marysville, KS (US); Blake Meyer, Smith Center, KS (US); Jason Smith, Portage, MI (US)

(73) Assignee: Schenck Process LLC, Kansas City, MO (US)

( * ) Notice: Subject to any disclaimer, the term of this patent is extended or adjusted under 35 U.S.C. 154(b) by 253 days.

(21) Appl. No.: 18/489,477

(22) Filed: Oct. 18, 2023

(65) Prior Publication Data

US 2024/0156123 A1      May 16, 2024

Related U.S. Application Data

(60) Provisional application No. 63/383,598, filed on Nov. 14, 2022.

(51) Int. Cl.
*A23G 3/02*      (2006.01)
*A23G 3/34*      (2006.01)

(52) U.S. Cl.
CPC ......... *A23G 3/0284* (2013.01); *A23G 3/0038* (2013.01)

(58) Field of Classification Search
CPC ............................ A23G 3/0284; A23G 3/0038
See application file for complete search history.

(56) References Cited

U.S. PATENT DOCUMENTS

| | | | |
|---|---|---|---|
| 2003/0075830 A1 | 4/2003 | Sollich | |
| 2005/0220932 A1* | 10/2005 | van der Eerden | ...... A23P 30/10 |
| | | | 426/1 |

FOREIGN PATENT DOCUMENTS

| | | | |
|---|---|---|---|
| CN | 217 184 682 U | * | 8/2022 |
| JP | 2001017085 A | | 1/2001 |
| WO | WO-2008 110 400 A2 | * | 9/2008 |

OTHER PUBLICATIONS

PCT Search Report and Written Opinion dated Feb. 8, 2024 for related PCT Patent Application No. PCT/US2023/077167, 13 pages.

* cited by examiner

*Primary Examiner* — Mohammad M Ameen
(74) *Attorney, Agent, or Firm* — Hovey Williams LLP; Paul J. Walker

(57) ABSTRACT

A demolding device and process are provided for continuously removing confectionaries, such as jelly candies, from a flexible mold. The demolding device contains a drive roller for applying pressure to the mold, a plurality of angled gussets for positioning the mold during confectionary extraction, and a plurality of agitators for removing the confectionaries from the mold cavities. The resulting device and process can facilitate the efficient and safe removal of confectionaries from flexible elastomeric molds.

20 Claims, 17 Drawing Sheets

CONFECTIONARY DEMOLDING DEVICE AND PROCESS

RELATED APPLICATIONS

This application claims the priority benefit under 35 U.S.C. § 119(e) of U.S. Provisional Patent Application Ser. No. 63/383,598 entitled "CONFECTIONARY DEMOLDING DEVICE AND PROCESS," filed Nov. 14, 2022, the entire disclosure of which is incorporated herein by reference.

BACKGROUND

1. Field of the Invention

A device and process are provided for removing confectionary from molds. More particularly, a device and process are provided for removing jelly candies, such as gummies, from a silicone mold.

2. Description of the Related Art

Generally, confectionaries, such as jelly candies, are formed and produced in pre-formed molds. However, removing the formed confectionaries from the mold can be a time-consuming and labor-intensive process.

Presently, most demolding processes involving confectionaries are carried out manually, where an individual manually removes each confectionary from a mold. Such processes can require considerable manual labor and oversight. Additionally, there are demolding processes that generally consist of loading a silicone mold, cavity down, onto custom mold negatives to match the cavity shape. Demolding devices then compress the back of each cavity with pin-type members to protrude the confectionaries from each cavity. Unfortunately, these previous devices and processes suffer from inefficiencies and require significant operator oversight while in operation.

Thus, there is a need for a more efficient and superior demolding device and process for removing confectionaries from non-rigid molds.

SUMMARY

One or more embodiments generally concern a demolding device for removing confectionaries from a production mold. Generally, the device comprises: (a) an angled carriage frame comprising a plurality of idle rollers configured to support a flexible production mold; (b) a plurality of support gussets positioned in the carriage frame, wherein the support gussets are configured to position the flexible production mold at an angle of 20° to 70° while in the device; (c) a drive roller positioned in the device above the carriage frame, wherein the drive roller is configured to apply pressure on the flexible production mold and facilitate movement of the flexible production mold through the device; (d) a plurality of first agitators attached to a first shaft, wherein the first shaft is positioned in the device below the support gussets, wherein the first agitators comprise a plurality of first finger extensions configured to contact at least a portion of one or more cavities within the flexible production mold; and (e) a plurality of second agitators attached to a second shaft, wherein the second shaft is positioned in the device below the support gussets, wherein the second agitators comprise a plurality of second finger extensions configured to contact at least a portion of the one or more cavities within the flexible production mold.

One or more embodiments generally concern a process for removing confectionaries from a production mold. Generally, the process comprises: (a) providing a production mold comprising a bottom side and a top side containing a plurality of filled cavities, wherein each of the filled cavities contain a confectionary; (b) introducing at least a portion of the production mold into a demolding device, wherein the demolding device comprises— (i) an angled carriage frame comprising a plurality of idle rollers configured to support the production mold, (ii) a plurality of support gussets positioned in the carriage frame, wherein the support gussets are configured to position the production mold at an angle of 20° to 70° while in the device, (iii) a drive roller positioned in the device above the carriage frame, wherein the drive roller is configured to apply pressure on the production mold and facilitate movement of the production mold through the device, (iv) a plurality of first agitators attached to a first shaft, wherein the first shaft is positioned in the device below the support gussets, wherein the first agitators comprise a plurality of first finger extensions configured to contact at least a portion of the filled cavities within the production mold, and (v) a plurality of second agitators attached to a second shaft, wherein the second shaft is positioned in the device below the support gussets, wherein the second agitators comprise a plurality of second finger extensions configured to contact at least a portion of the filled cavities within the production mold; (c) transferring the production mold through the demolding device via the drive roller, wherein the drive roller contacts at least a portion of the bottom side of the production mold; and (d) contacting the first agitators and the second agitators of the demolding device with at least a portion of the filled cavities within the production mold thereby removing the confectionary from within the filled cavities.

One or more embodiments generally concern a process for removing confectionaries from a production mold. Generally, the process comprises: (a) providing a production mold comprising a bottom side and a top side containing a plurality of filled cavities, wherein each of the filled cavities contain a jelly candy; (b) introducing at least a portion of the production mold into a demolding device, wherein the demolding device comprises— (i) an angled carriage frame comprising a plurality of idle rollers configured to support the production mold, (ii) a plurality of support gussets positioned in the carriage frame, wherein the support gussets are configured to position the production mold at an angle of 30° to 60° while in the device, (iii) a drive roller positioned in the device above the carriage frame and connected to a first motor, wherein the drive roller is configured to apply pressure on the production mold and facilitate movement of the production mold through the device, (iv) a plurality of first agitators attached to a first shaft, wherein the first shaft is positioned in the device below the support gussets and is connected to a second motor, wherein the first agitators comprise a plurality of first finger extensions configured to contact at least a portion of the filled cavities within the production mold, and (v) a plurality of second agitators attached to a second shaft, wherein the second shaft is positioned in the device below the support gussets and is connected to the second motor or a third motor, wherein the second agitators comprise a plurality of second finger extensions configured to contact at least a portion of the filled cavities within the production mold; (c) transferring the production mold through the demolding device via the drive roller, wherein the drive roller contacts at least a portion of the bottom side of the production mold, wherein the drive roller has a rotation rate of 5 to 100 rpm; and (d) contacting the first agitators and the second agitators of the demolding device with at least a portion of the filled cavities within the production mold thereby removing the jelly candy from within the filled cavities, wherein the first agitators and the second agitators exhibit a Slaps Per Gummy (SPG) rate of 1 to 10.

BRIEF DESCRIPTION OF THE FIGURES

Embodiments of the present invention are described herein with reference to the following drawing figures, wherein.

DETAILED DESCRIPTION

A demolding device and process have been developed for continuously removing confectionary from flexible and non-metallic molds that are used to form the confectionary. More particularly, a demolding device and process have been developed for rapidly and consistently removing jelly candies, such as gummies, from flexible elastomeric molds without causing damage to the mold and/or candies.

While other demolding devices require manually loading and unloading of silicone molds prior to demolding, the demolding device described herein allows for continuous feeding of the demolding device. Consequently, this significantly reduces operator involvement and increases the overall throughput of the product. Additionally, while other demolding devices require custom mold negatives to match the mold cavities, the demolding device of the present disclosure can handle complex mold shapes and various mold lengths without the need for a mold negative. This is due to the present device's simultaneous implementation and use of several different removal techniques and components. For example, in contrast to existing demolding devices, the demolding device described herein contains several components below the molds that directly interact with the confectionaries, thereby ensuring better candy removal than other designs.

Generally, the molds used with the demolding device are flexible, non-metallic molds made from a thermoset or thermoplastic elastomer. In various embodiments, the molds are formed from a thermoset elastomer, such as silicone.

Figure 1:
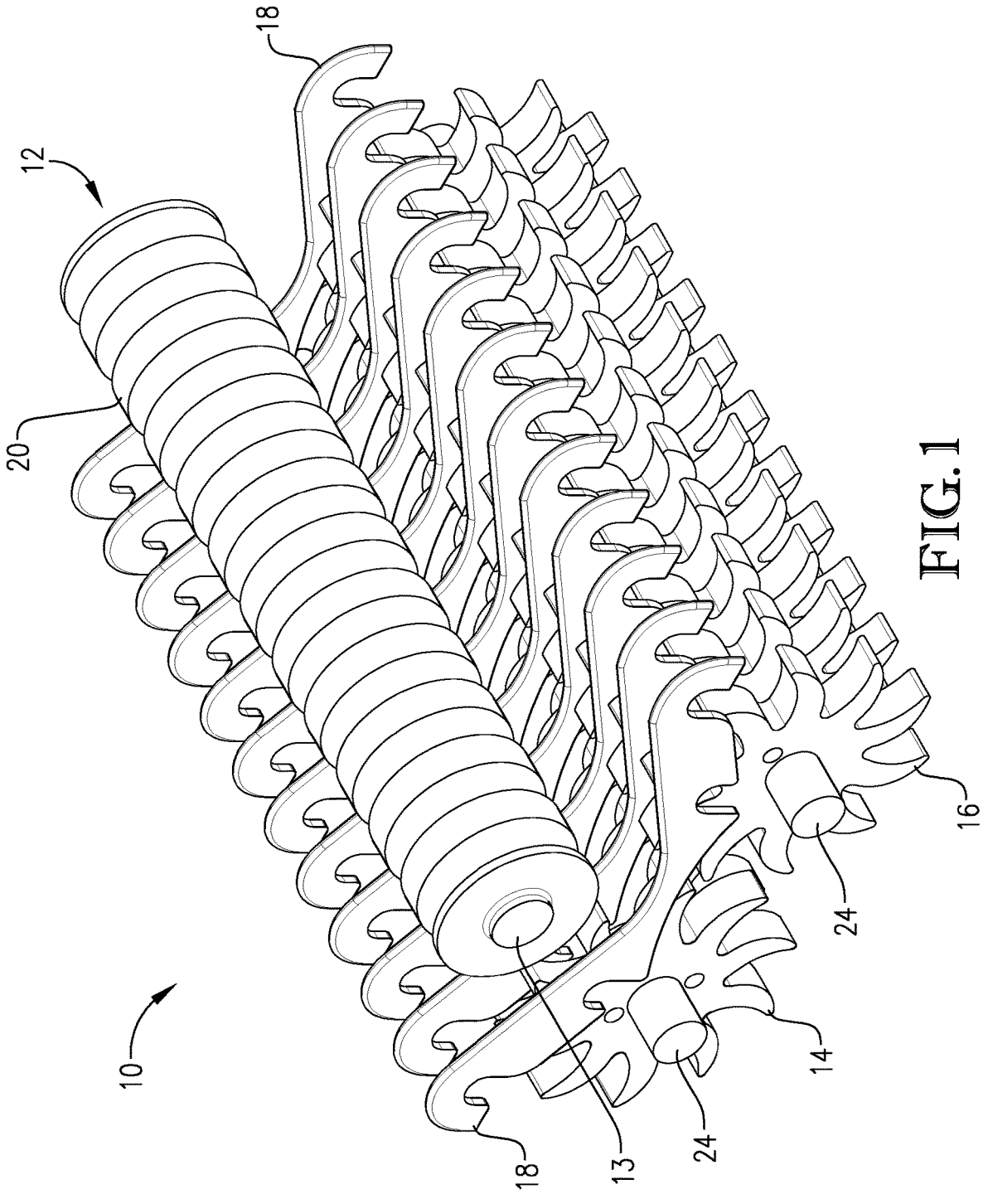
FIG. 1 depicts an exemplary embodiment of the drive roller, gussets, and agitators within the demolding device configuration.

An exemplary demolding device 10 is shown in FIG. 1. As shown in FIG. 1, the demolding device comprises a drive roller 12, a plurality of first agitators 14, a plurality of second agitators 16, and a plurality of gussets 18 for guiding and supporting the mold. Generally, the drive roller 12 contains a plurality of raised roller steps 20, which are designed to apply pressure to the backside of the mold, particularly against the back side of the mold cavities holding the confectionaries, and may be in the form of ridges. The raised roller steps may be coated with an elastomer and/or may be formed from an elastomer to facilitate the contact and interaction between the drive roller and the mold. As used herein, the term "drive roller" may be used interchangeably with the term "feed roller."

In certain embodiments, the gussets 18 may be passively coated with a food-grade release agent, such as a food-grade wax or oil, which facilitates the movement of the mold through the device. The release agent can be derived from the cavities of the mold and may be applied by the confectionary manufacturer to the mold cavities prior to the production of the confectionaries. The primary function of the release agent is to facilitate the removal of the confectionaries from the mold cavities; however, the release agent may get passively applied to the gussets 18 over time and use of the device 10, thereby providing the aforementioned secondary benefit.

The drive roller 12 and agitators 14, 16 may be positioned on independent shafts that are each driven by a separate motor (not pictured). Thus, the speeds and spin directions of the drive roller 12 and agitators 14, 16, may be independently controlled via these separate motors. Thus, in various embodiments, the drive roller 12, the shaft for the agitators 14, and the shaft for the agitators 16 may all be independently controlled using separate motors.

In one or more embodiments, the shaft 13 of the drive roller 12 is operably connected to a first motor, which controls the rotation speed and/or spin direction of the drive roller 12. Additionally, in various embodiments, the first shaft 24 for agitators 14 may be operably connected to a second motor and the second shaft 24 for agitators 16 may be operably connected to a third motor, both of which control the rotation speeds and/or spin directions of the respective shafts. Thus, in such embodiments, the rotation speed and/or spin direction of each of the three shafts may be independently controlled.

In one or more embodiments, the rotation speed of the agitator shafts can be maintained at a rate of at least 10, 15, 20, 25, 30, 35, 40, 50, 55, or 60 rpm and/or less than 120, 110, 100, 90, 80, or 75 rpm.

In one or more embodiments, the rotation speed of the drive roller can be maintained at a rate of at least 1, 2, 3, 4, 5, 6, 7, 8, 9, 11, or 12 rpm and/or less than 100, 90, 80, 70, 60, 50, 40, 30, 25, 20, or 15 rpm.

Turning again to FIG. 1, the gussets 18 may be positioned so that they provide an angled surface upon which to position the mold relative to the drive roller 12. In various embodiments, the gussets 18 may be angled at an angle of at least 20°, 25°, 30°, 35°, 40°, 45°, or 50° and/or less than 90°, 85°, 80°, 75°, 60°, 65°, or 60°. Generally, the gussets 18 may be angled at an angle in the range of 30° to 60°. The gussets 18 may be individually spaced in a manner that accounts for the positions of the cavities within the molds. More particularly, the gussets 18 may be positioned relative to the mold so that the gussets are lined up outside of the cavities in the mold, thereby not interfering with the removal of the confectionaries from within the cavities of the molds. The gussets 18 may be formed from a thermoplastic rigid polymer.

Figure 2:
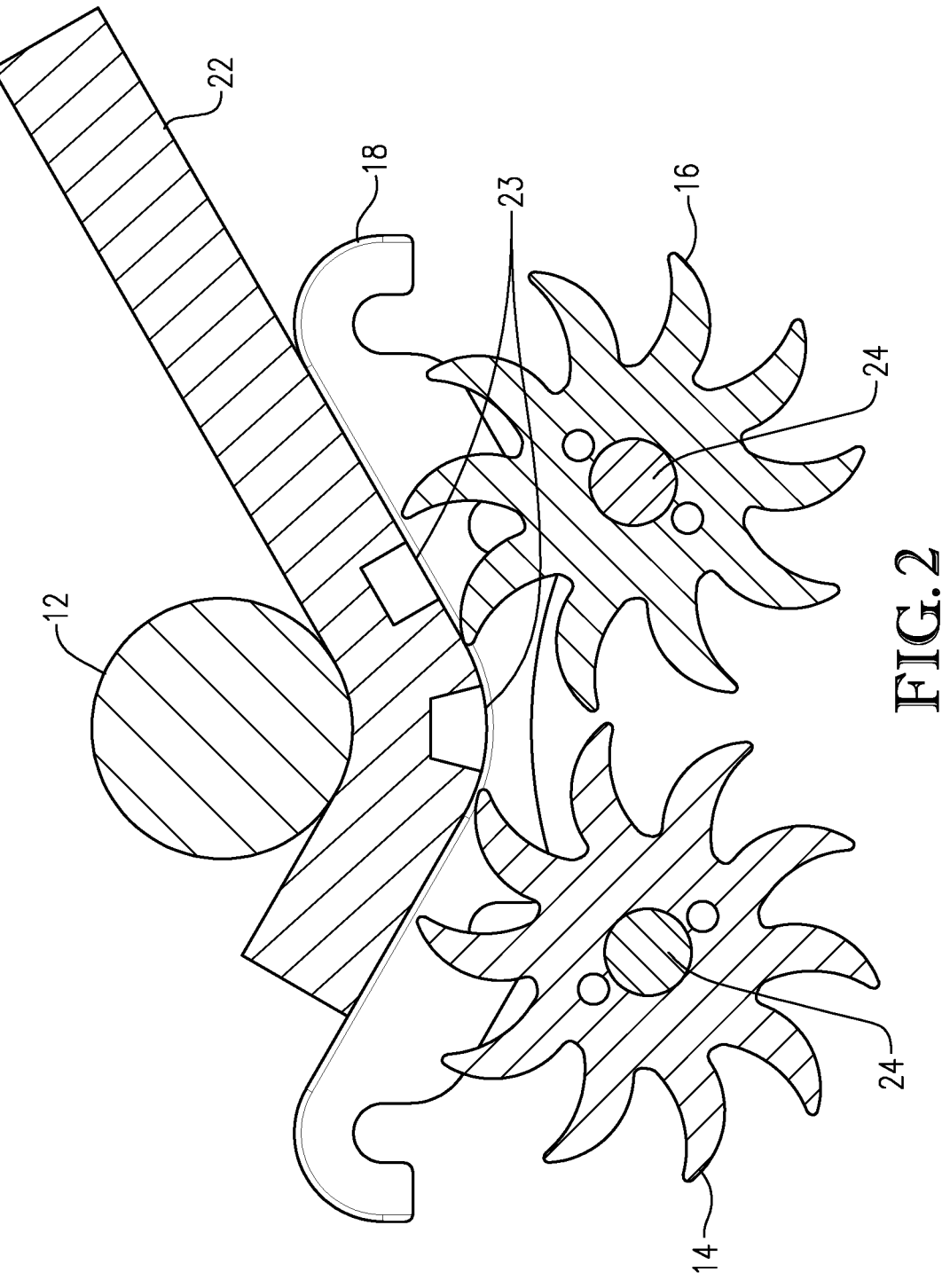
FIG. 2 depicts a side view of a production mold going through the demolding device according to one embodiment of the present disclosure.

FIG. 2 depicts how the molds 22 may be fed into the demolding device 10 and how the confectionaries may be removed from the cavities within the mold. As shown in FIG. 2, a silicone mold 22 may be introduced into the device with the cavities 23 facing down. The mold 22 can be positioned so that the cavities 23 in the mold are separated by the gussets 18 and the mold 22 is driven through the device via the drive roller 12. Furthermore, the raised roller steps 20 of the drive roller 12 may be positioned above the back side of the mold cavities 23 to thereby exert additional force onto the mold 22 and cause the confectionaries to protrude from the mold by expanding the cavities 23. As depicted in FIG. 2, the mold 22 rides on the angular surface of the gussets 18.

During the process, and as shown in FIG. 2, the device 10 passively bends back the mold 22 to deform the cavities 23 and thereby open them. Simultaneously, the confectionaries, such as the jelly candies, may be scraped off the mold and/or hooked by a pair of spinning removal devices, i.e., the agitators 14, 16. As shown in FIG. 2, the agitators 14, 16, may contain a plurality of finger extensions that are configured to physically interact with the mold 22 and the confectionaries within the mold cavities 23. The front set of agitators 14 and the back set of agitators 16 are configured to operate with opposite spins (e.g., the front agitators 14 spin clockwise, while the back agitators 16 spin counterclockwise). The number of agitators 14, 16, positioned on the corresponding shafts may be adjusted based on the number of cavities within a row of the mold 22. For instance, if the mold has a row of 11 cavities, then the number of agitators on the agitator shafts may be adjusted to contain 11 agitators. Thus, there would be a set of agitators 14, 16, for each row of cavities in the mold 22.

FIG. 2 depicts the agitators 14, 16, as containing 10 finger extensions. However, the number of fingers on the agitators 14, 16, may be modified depending on the size and speed of the device. Generally, the agitators 14, 16, may contain at least 5, 6, 7, 8, or 9 fingers and/or less than 20, 18, 16, 15, 14, 13, 12, or 11 fingers. The penetration depth of the finger extensions may be varied and adjustable based on the depth of the cavities 23 in the mold 22. The depth of the fingers within the mold cavity 23 may be adjusted and controlled by: (1) adjusting the pressure applied by the drive roller 12 to the mold and/or (2) adjusting the position of the shaft(s) holding the agitators 14, 16. Additionally, the shaft of the drive roller 12 may be adjustable, thereby allowing a user to control the pressure applied by the drive roller and the protrusion depth of the roller steps 20.

In one or more embodiments, the rotation speed of the agitator shafts can be controlled so that the Slaps Per Gummy ("SPG") value is optimized for the production mold. As used herein, the "Slaps Per Gummy" or "SPG" value refers to the number of times that an arm of an agitator will contact a corresponding cavity and confectionery within the production mold. In various embodiments, the agitator shafts can be controlled so as to allow a SPG value of at least 1, 2, 3, 4, or 5 slaps and/or less than 20, 15, 10, 9, 8, 7, or 6 slaps.

In various embodiments, the average width of the roller steps 20 can correspond to and directly match the average widths of the cavities within the production mold. Alternatively, in various embodiments, the average width of the roller steps 20 can be greater than or less than the average widths of the cavities within the production mold.

The agitators 14, 16, may be formed from a flexible material, such as a thermoplastic elastomer (e.g., polyurethane) and/or a thermoset elastomer, so that the agitators may physically interact with the confectionaries and the mold 22 without causing damage to either. The contoured shape of the agitators 14, 16, and their fingers, in addition to mold interference by the drive roller 12 and gussets 18, enables efficient removal of the confectionaries (e.g., jelly candies) from the cavities of the mold 22.

Figure 3:
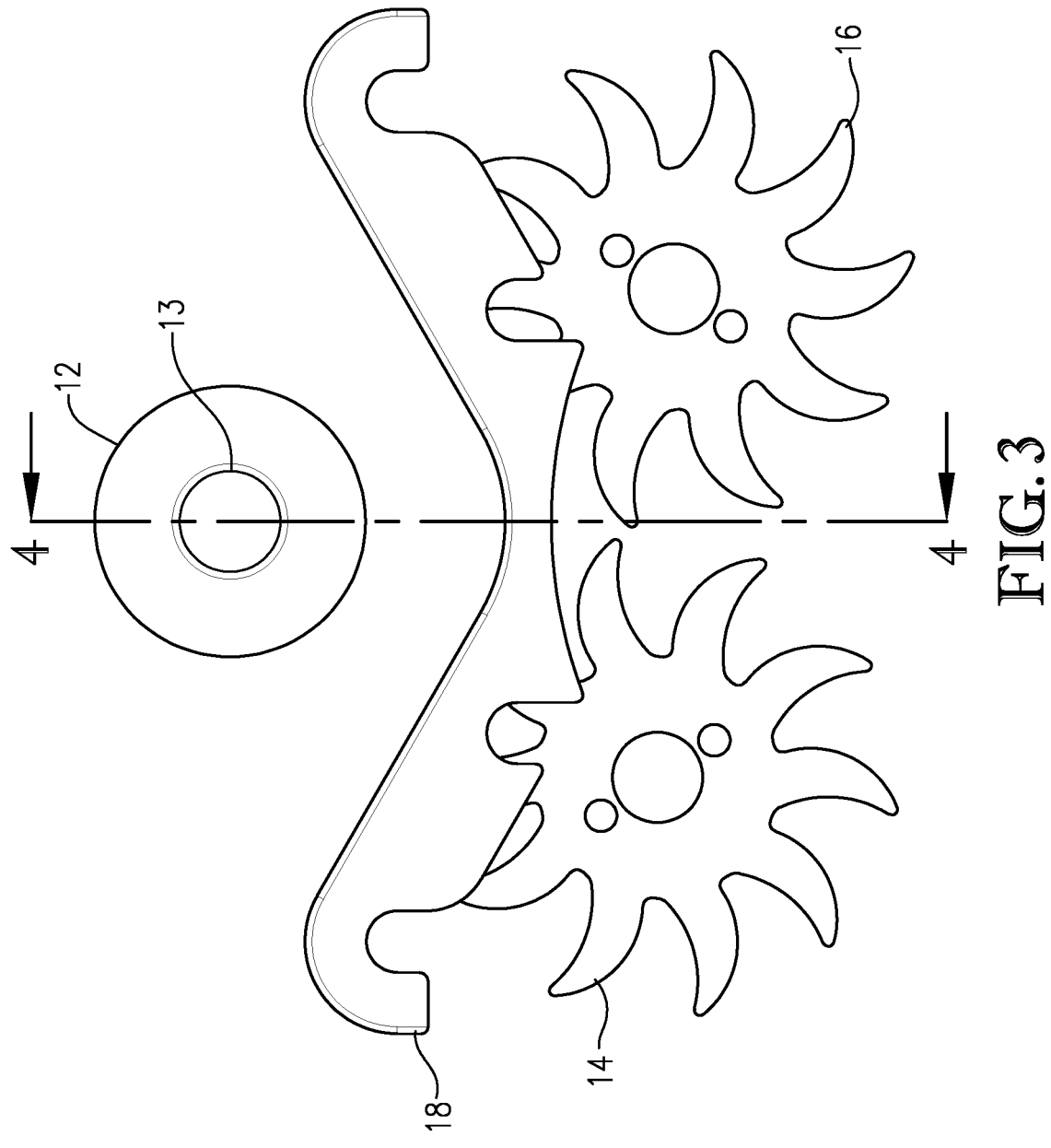
FIG. 3 depicts a side view of the agitators and gusset according to one embodiment of the present disclosure.
Figure 4:
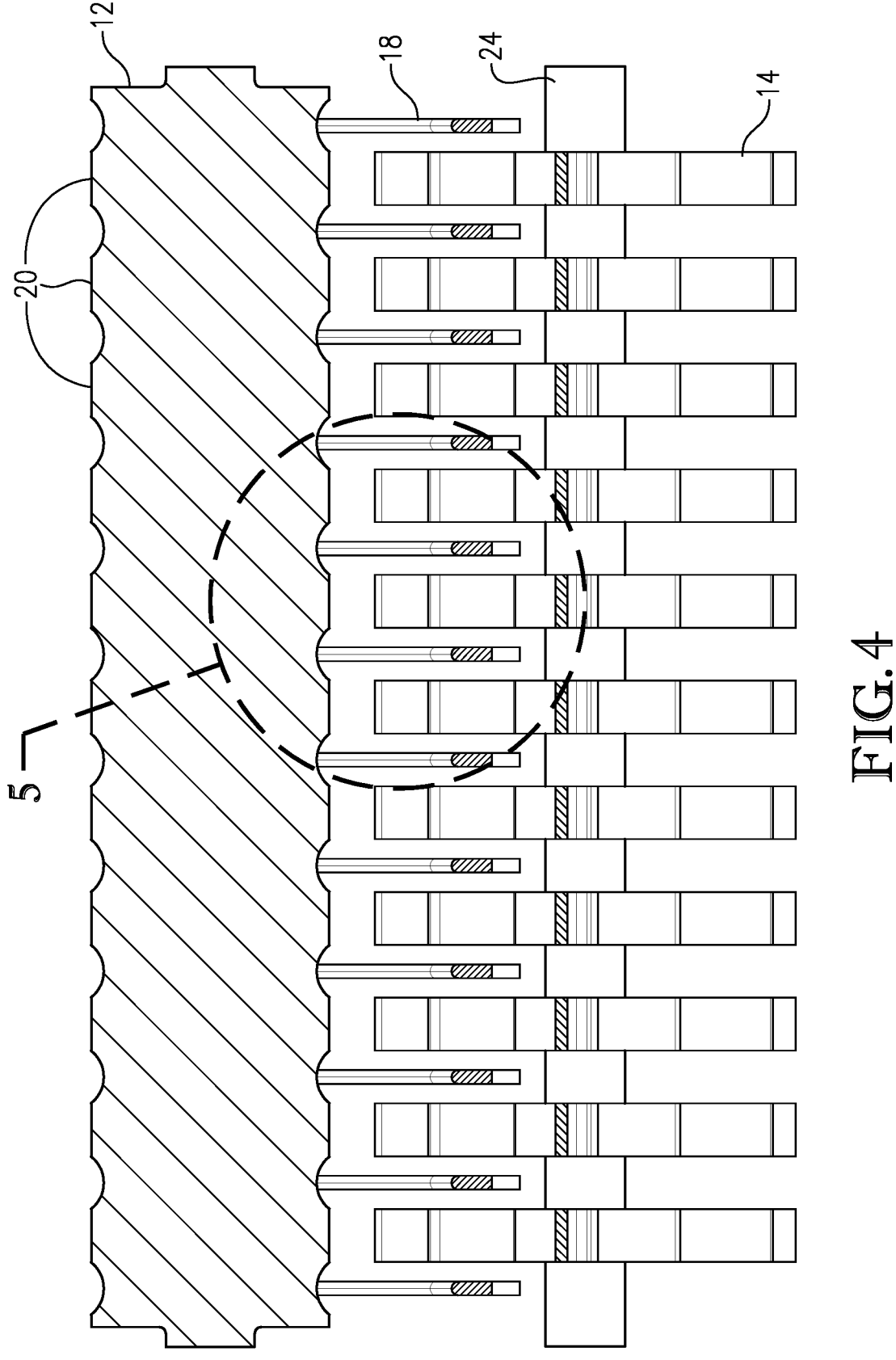
FIG. 4 depicts a bisected view of the device in FIG. 3 along the bisected line.
Figure 5:
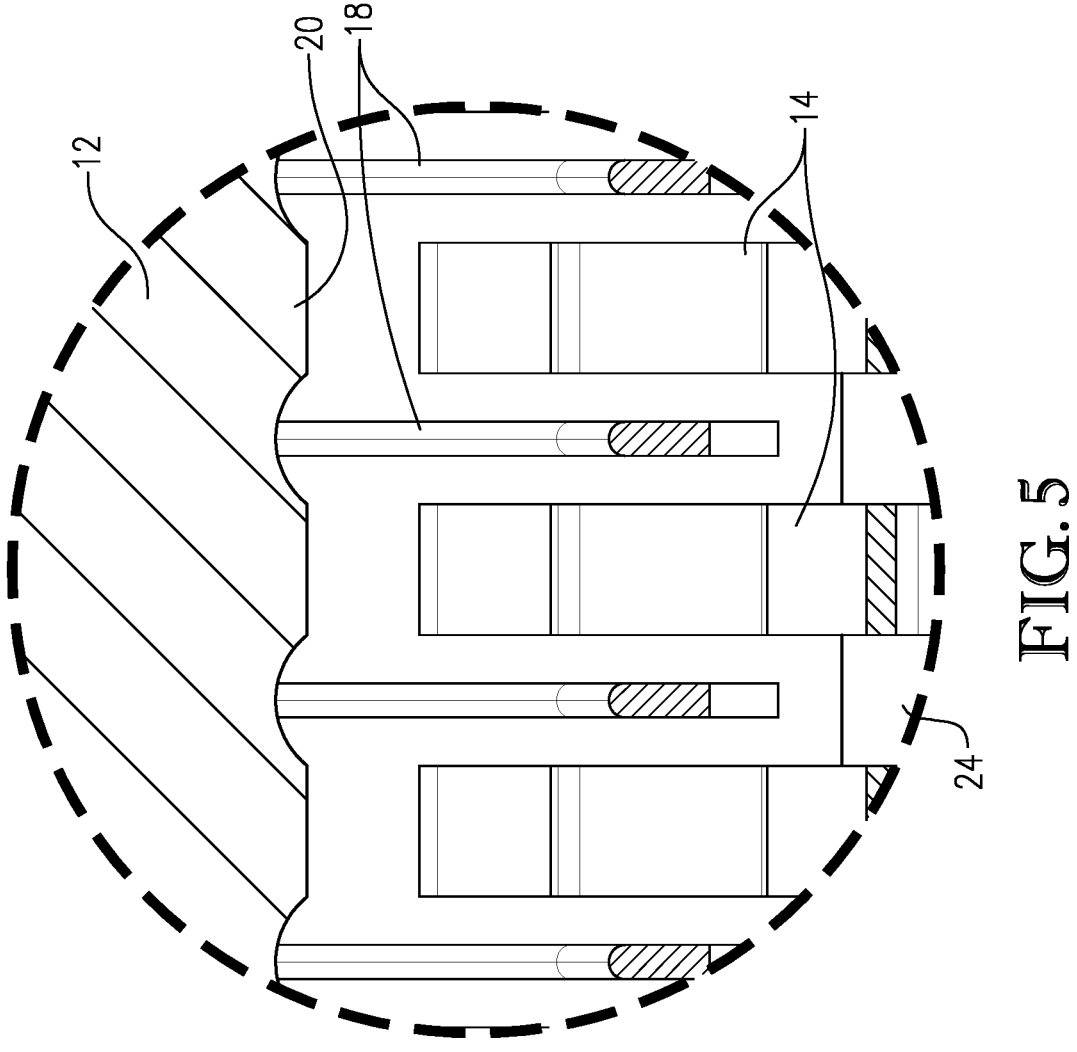
FIG. 5 depicts a close-up view of the circled section in FIG. 4.

FIGS. 3-5 show different viewpoints of the device 10, particularly of the positioning of the drive roller, agitators 14, 16, and gussets 18.

Figure 6:
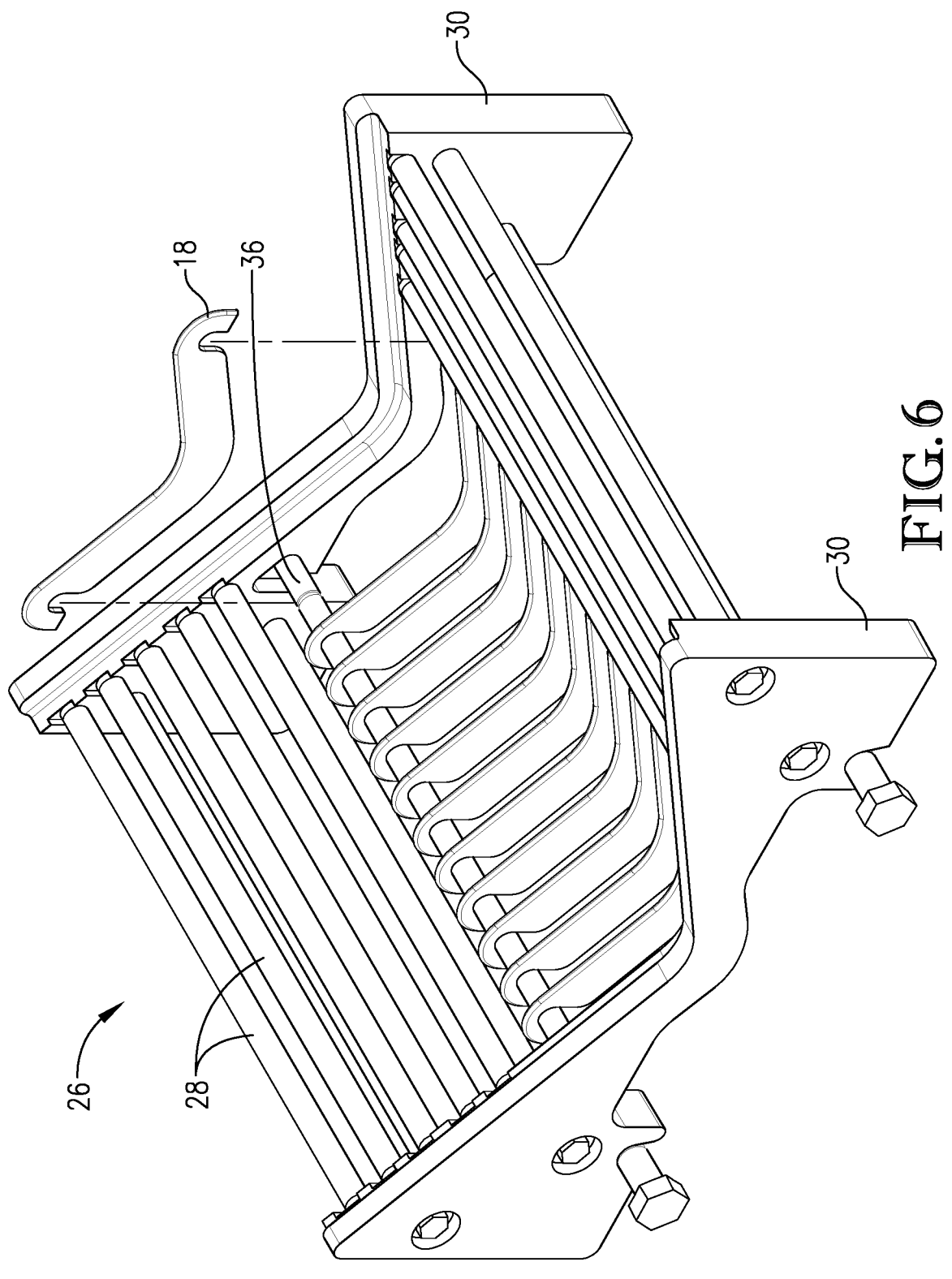
FIG. 6 depicts an exemplary embodiment of the demolder carriage according to one embodiment of the present disclosure.

FIG. 6 depicts the angled demolder carriage 26, which supports and positions the gussets 18 and a plurality of idle rollers 28 and may also be used to support and guide the mold. As shown in FIG. 6, the carriage 26 contains a plurality of idle rollers 28, which facilitate the movement of the mold along the angled gussets 18 and towards the drive roller 12 and agitators 14, 16. The rollers 28 may be positioned at an angle and held in place via the carriage frame 30. Furthermore, the gussets 18 may be introduced and positioned in a perpendicular manner relative to the rollers 28.

Another notable benefit of the demolder device described herein is that several of its components are readily removable and interchangeable, thereby making the device easy to clean and rapidly modify based on the molds being introduced. For instance, as shown in FIGS. 6-11, the drive roller 12, the agitators 14, 16, and/or the idle rollers 28 may be designed to be readily removed from the carriage 26 with or without the use of tools. Thus, in such embodiments, any of these components may be removed from the device without disassembling another component.

As shown in FIG. 6, the gussets 18 may be readily removable and interchangeable within the carriage 26. For instance, the number of gussets 18 and the positioning width of the gussets may be readily modified within the carriage 26 to match the cavity spacing of the mold 22 by adding, removing, or moving any of the gussets positioned on two static support shafts 36.

Figure 7:
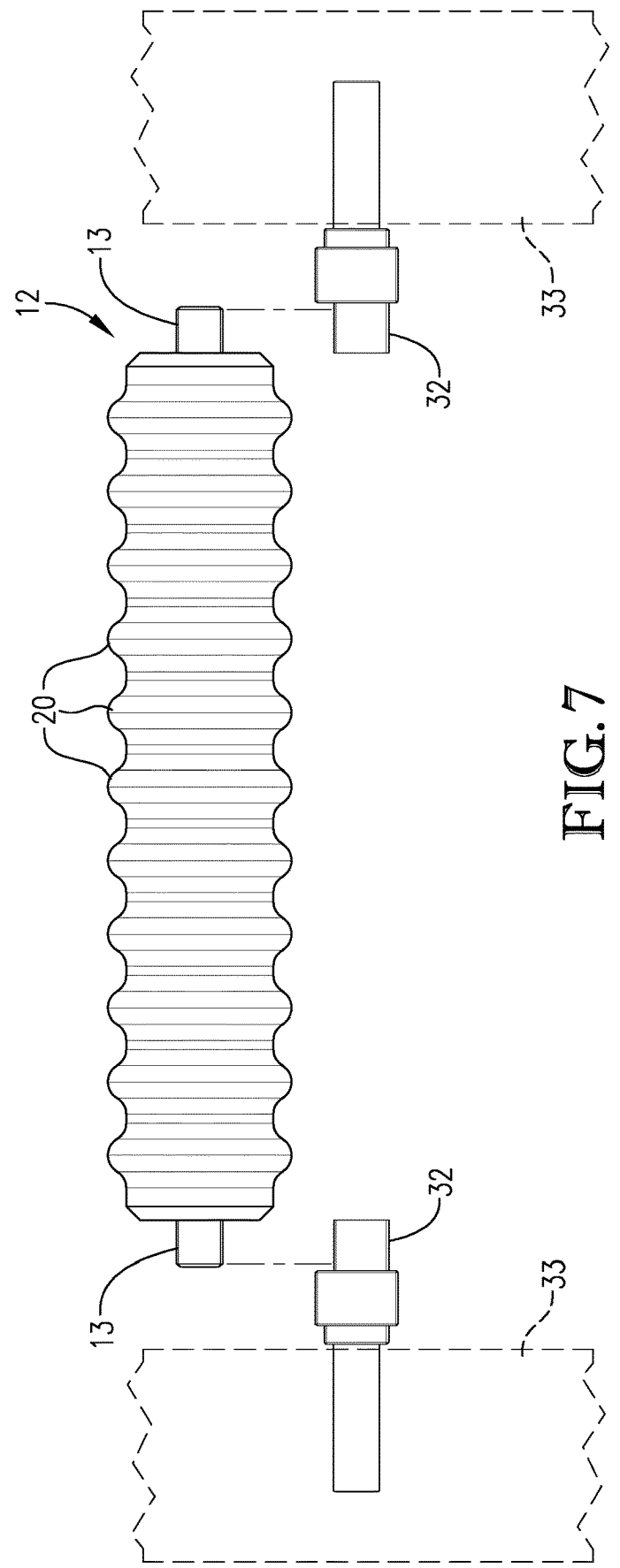
FIG. 7 depicts a side view of an exemplary removable drive roller according to one embodiment of the present disclosure.
Figure 8:
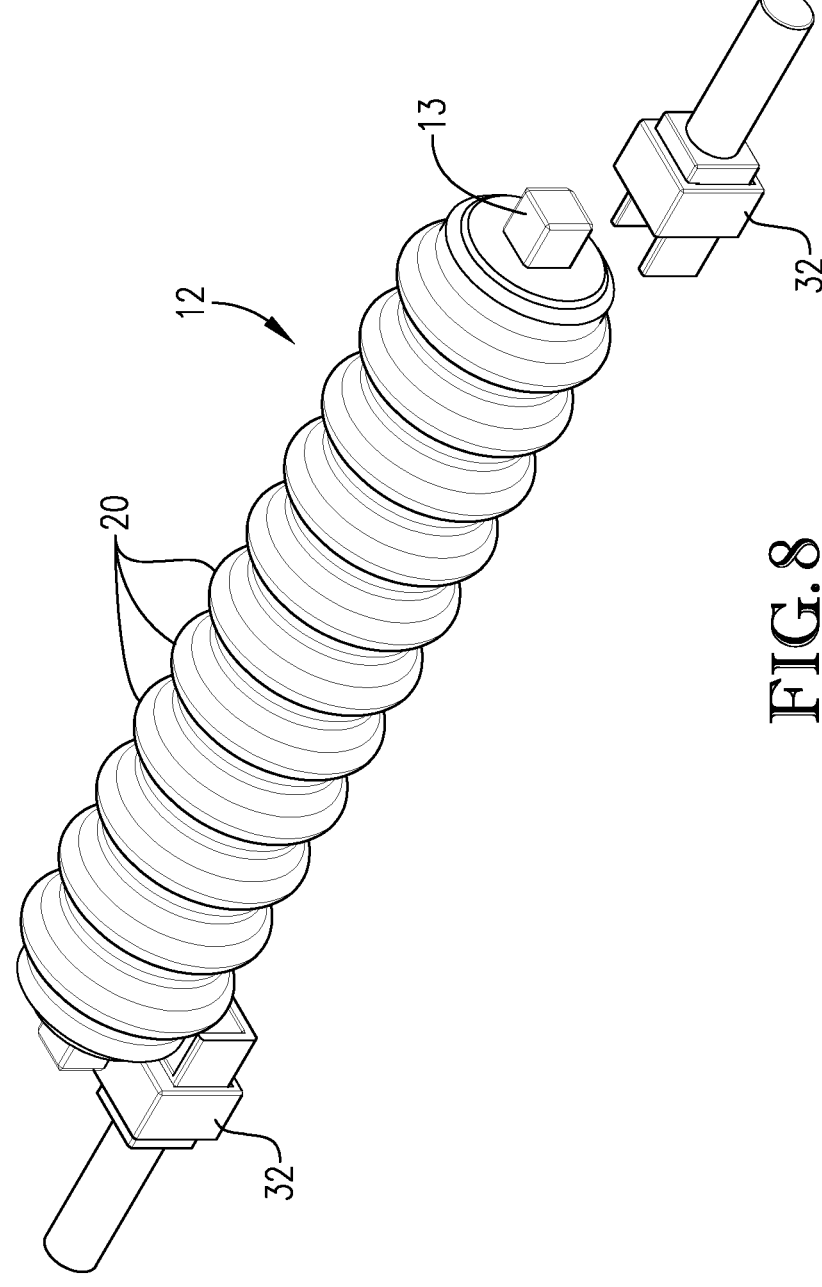
FIG. 8 depicts an alternative view of the removable drive roller.

As shown in FIGS. 7 and 8, the drive roller 12 may be secured and optionally removable from the carriage and/or the device via the driver roller mounting mechanism 32 positioned in the device frame 33. More particularly, the drive roller 12 can be easily removed from the device by simply lifting the drive roller from the drive roller mounting mechanism 32, which can hold the end nubs of the drive roller shaft 13. The mounting mechanism 32, which may be in the form of collars, may slide over the top of the square shaft ends in order to hold the shaft in place.

Figure 13:
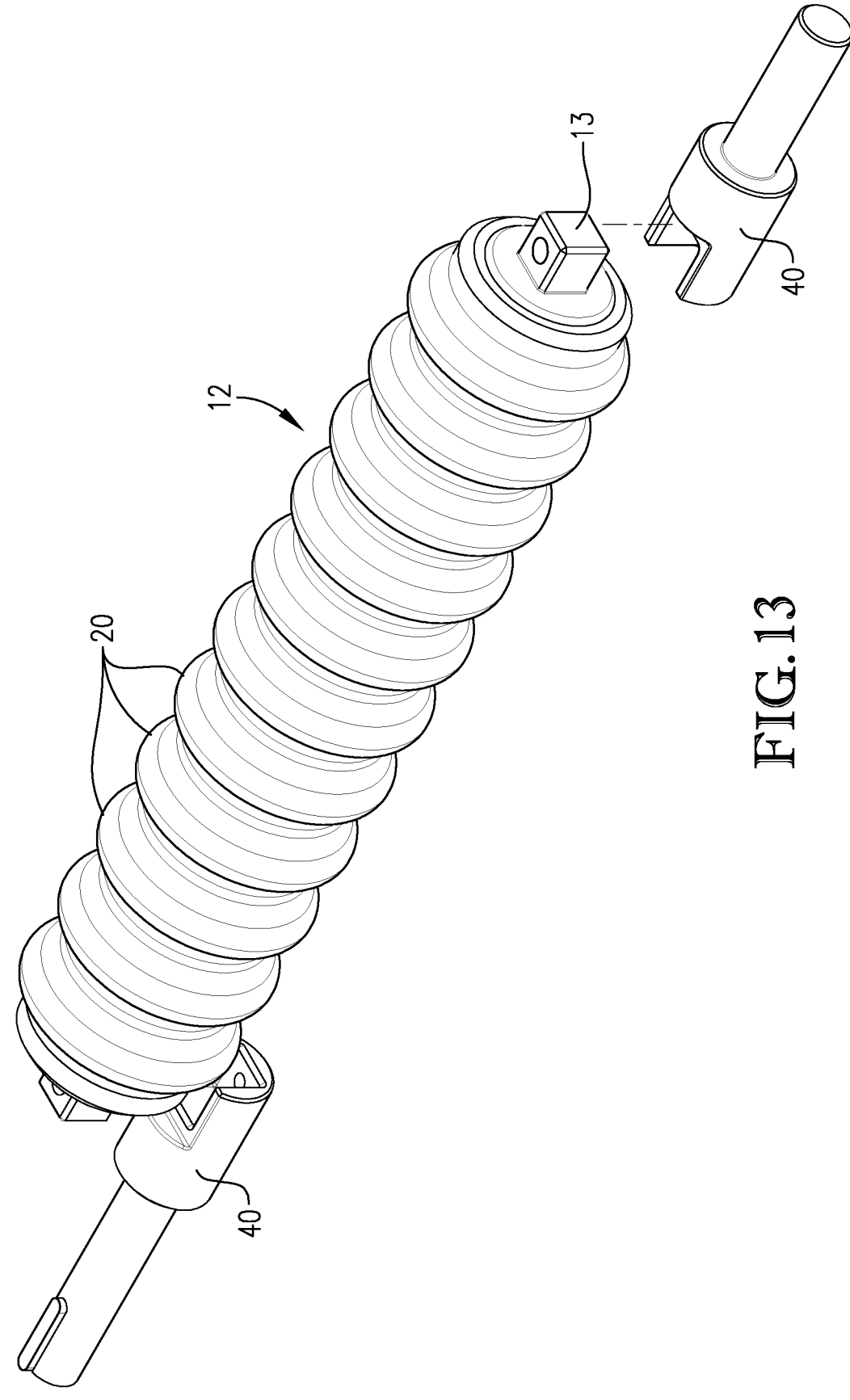
FIG. 13 depicts an alternative mounting collar configuration for the removable drive roller according to one embodiment of the present disclosure.
Figure 14:
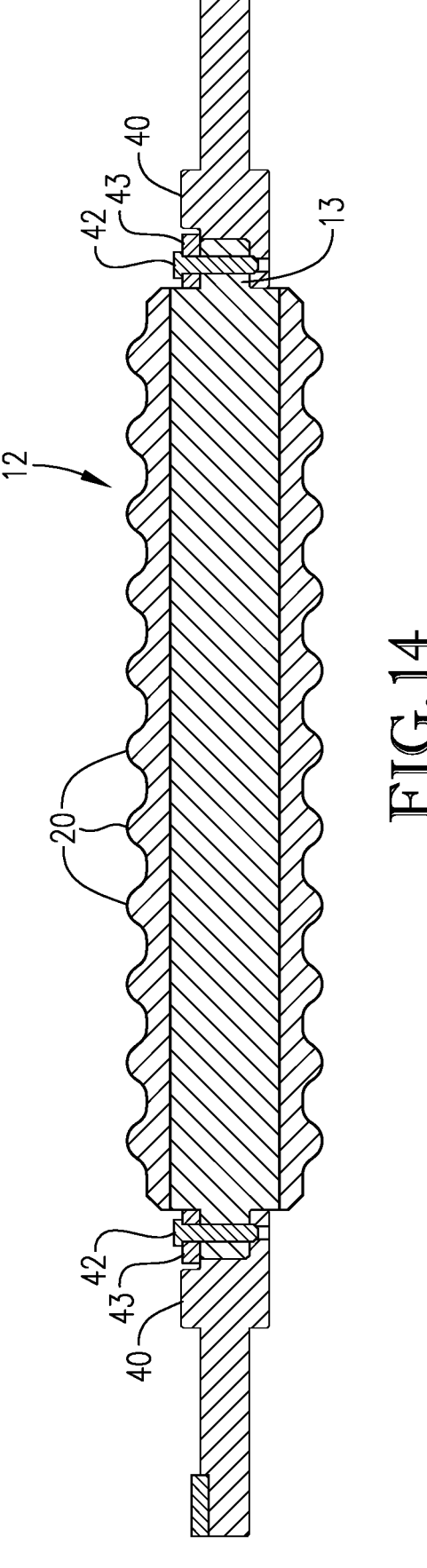
FIG. 14 depicts a side view of the alternative mounting collar configuration of FIG. 13.

FIGS. 13 and 14 depict an alternative shaft mounting configuration for the drive roller 12. As shown in FIGS. 13 and 14, the drive roller 12 may be secured above the carriage in the device frame 33 using a mounting mechanism 40 that utilizes a mounting plate 43, which is secured by a locking bolt 42. The drive roller 12 can be easily removed from the device by simply removing the locking bolt 42 and mounting plate 43 of the mounting mechanism 40, and then lifting the end nubs of the drive roller shaft 13 from the mounting mechanism 40.

Figure 9:
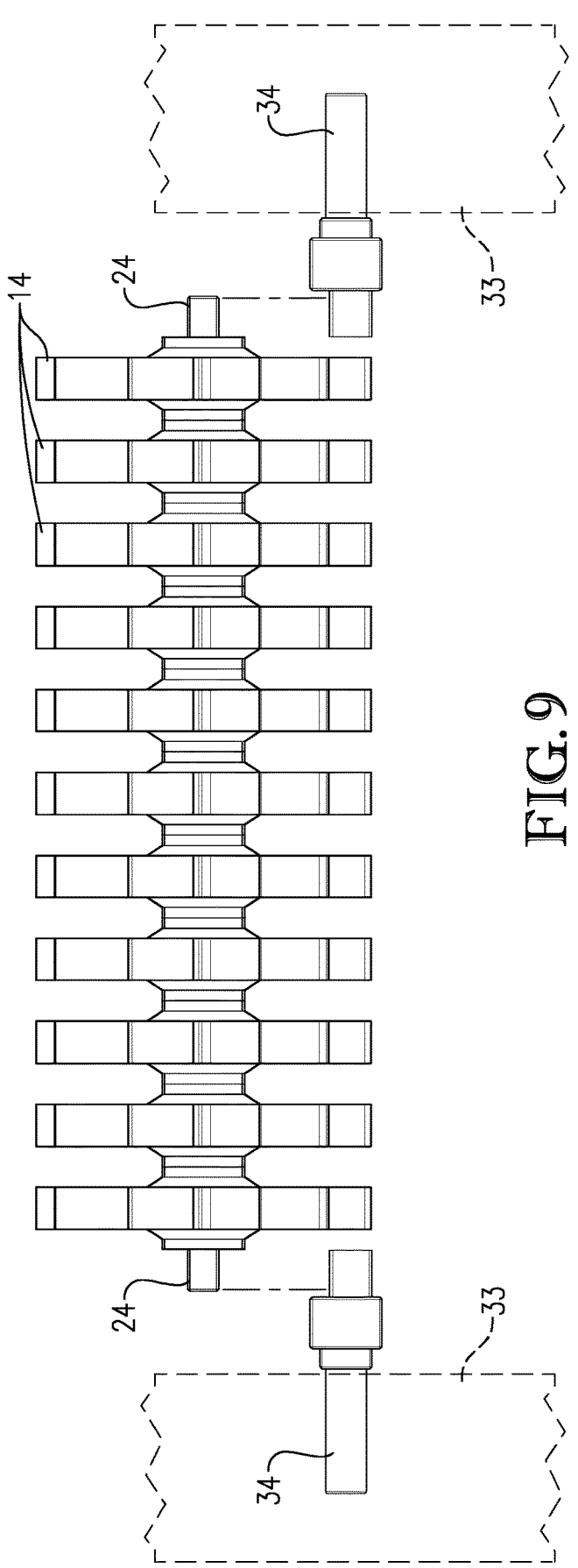
FIG. 9 depicts a side view of an exemplary removable agitator shaft according to one embodiment of the present disclosure.
Figures 10, 11:
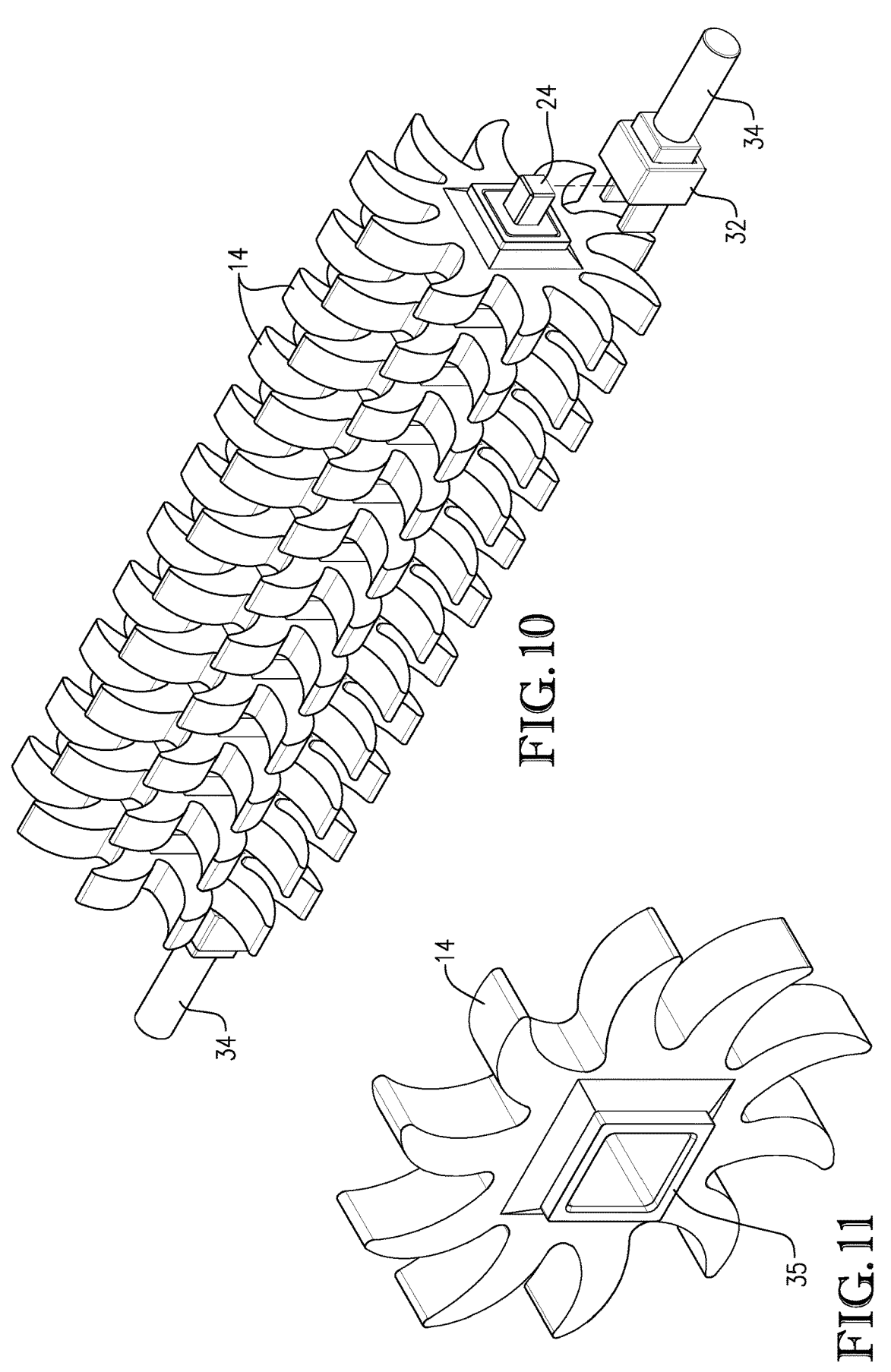
FIG. 10 depicts an alternative view of the removable agitator shaft.
FIG. 11 depicts an exemplary interchangeable agitator according to one embodiment of the present disclosure.

As shown in FIGS. 9 and 10, the agitator shafts 24 containing the agitators 14 may be secured and optionally removed from the carriage and/or the device via the agitator mounting mechanism 34 positioned in the device frame 33. More particularly, the agitator shafts can be easily removed from the device by simply lifting the shafts 24 from the agitator mounting mechanism 34, which can be in the form of collars and hold the end nubs of the agitator shafts 24.

Figure 12:
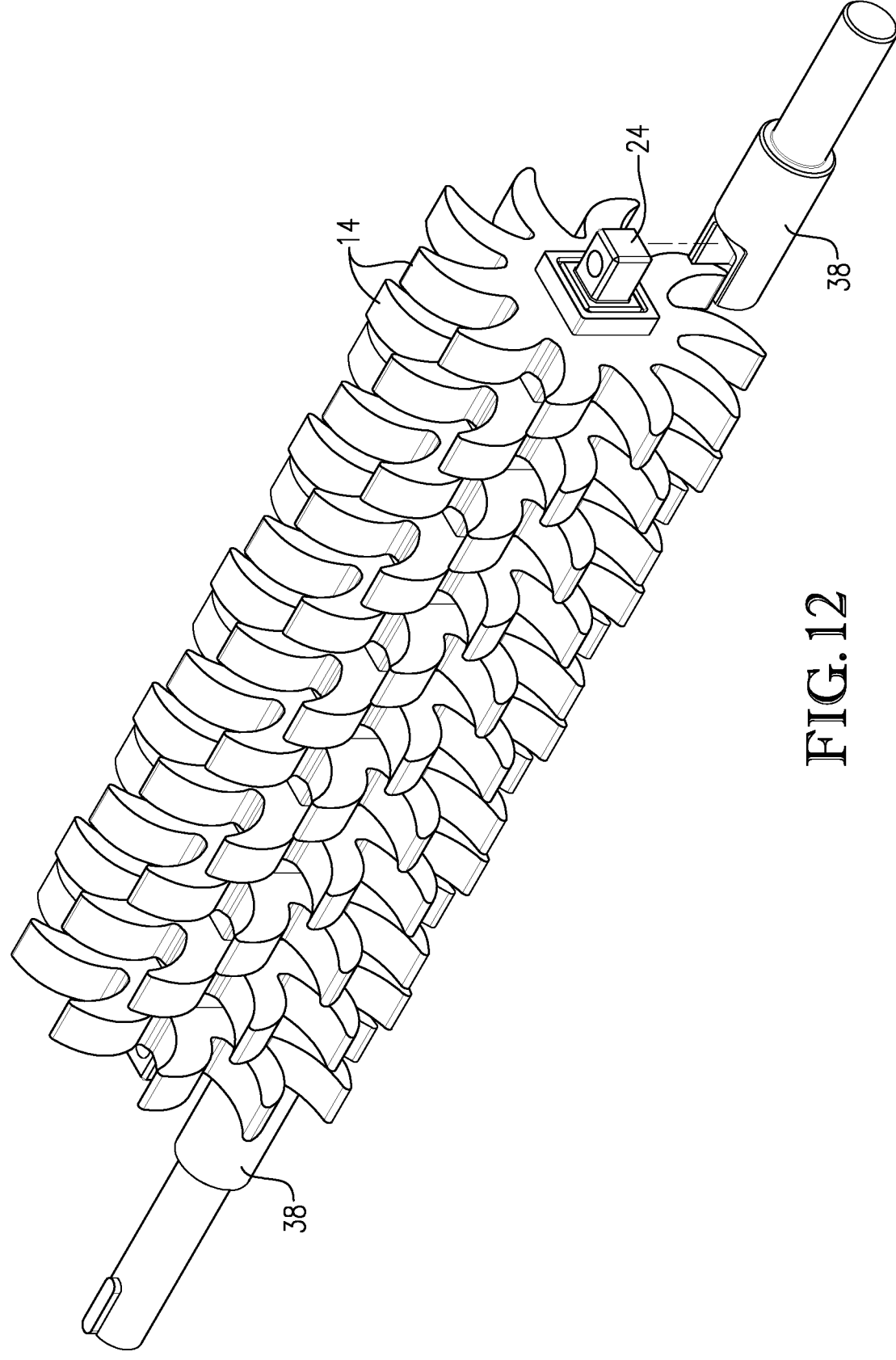
FIG. 12 depicts an alternative mounting collar configuration for the removable agitator shaft according to one embodiment of the present disclosure.

FIG. 12 depicts an alternative shaft mounting configuration for an agitator shaft 24. As shown in FIG. 12, the agitator shaft 24 may be positioned below the carriage using a mounting mechanism 38 that utilizes a mounting plate 43 and locking bolt 42, such as shown in FIG. 14. More particularly, the agitator shaft 24 can be easily removed from the device by simply removing the locking bolt 42 and mounting plate 43 of the mounting mechanism 38, and then lifting the end nubs of the agitator shaft 24 from the mounting mechanism 38.

As shown in FIG. 11, the agitators, such as the front agitators 14, can be configured and produced in a manner that allows the agitators to be readily removed and replaced on the agitator shaft 24. For example, the agitators may be molded with a collar 35 disposed within the agitator body in a manner that allows the agitators to be easily positioned and removed from the agitator shaft 24. Consequently, the use of these collars 35 imbedded within the agitators allows one to replace specific agitators due to wear and tear, while keeping other agitators in place that are still integrally sound.

Figure 15:
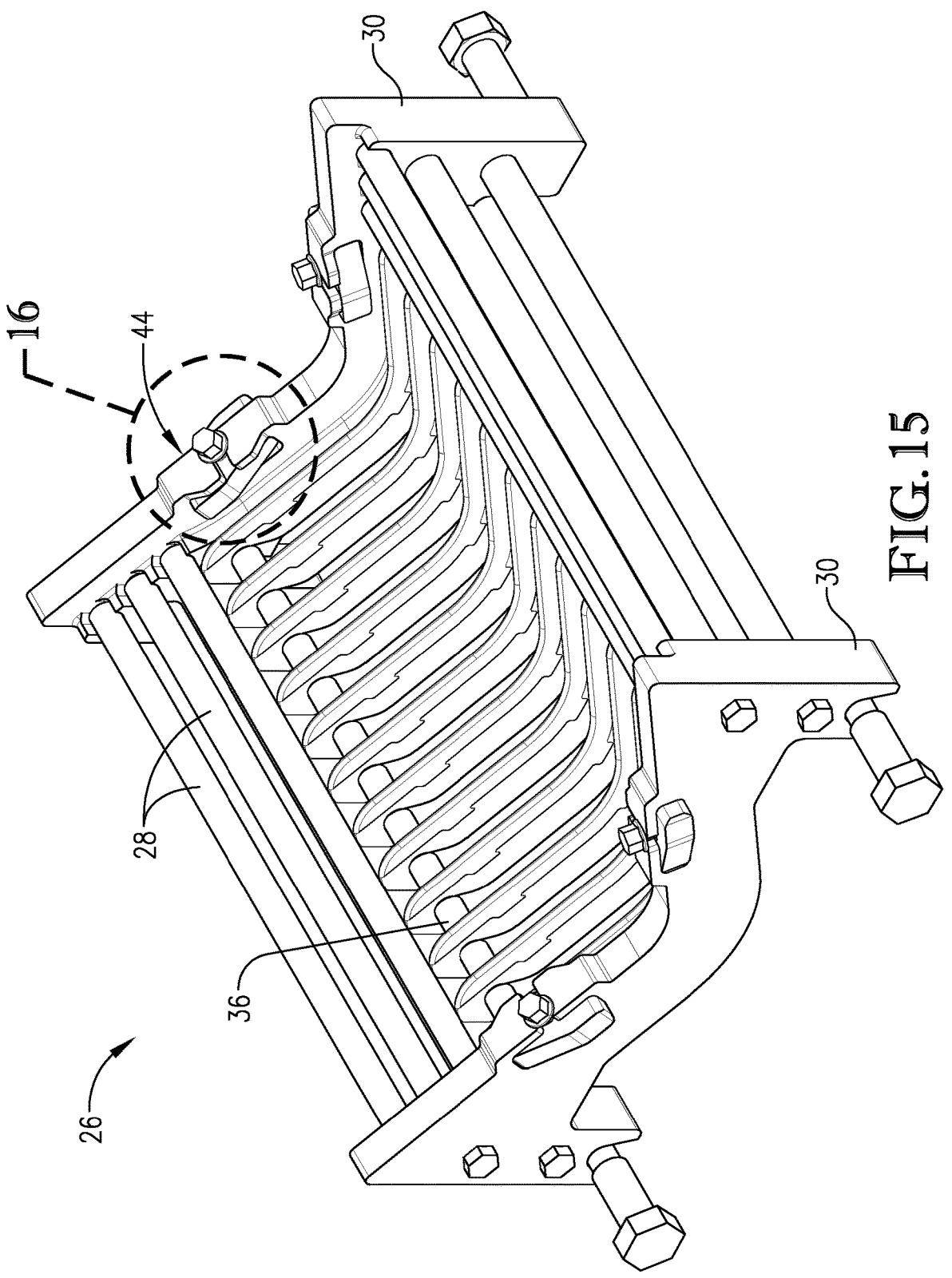
FIG. 15 depicts an exemplary embodiment of the demolder carriage with an adjustable mold centering mechanism according to one embodiment of the present disclosure.
Figure 16:
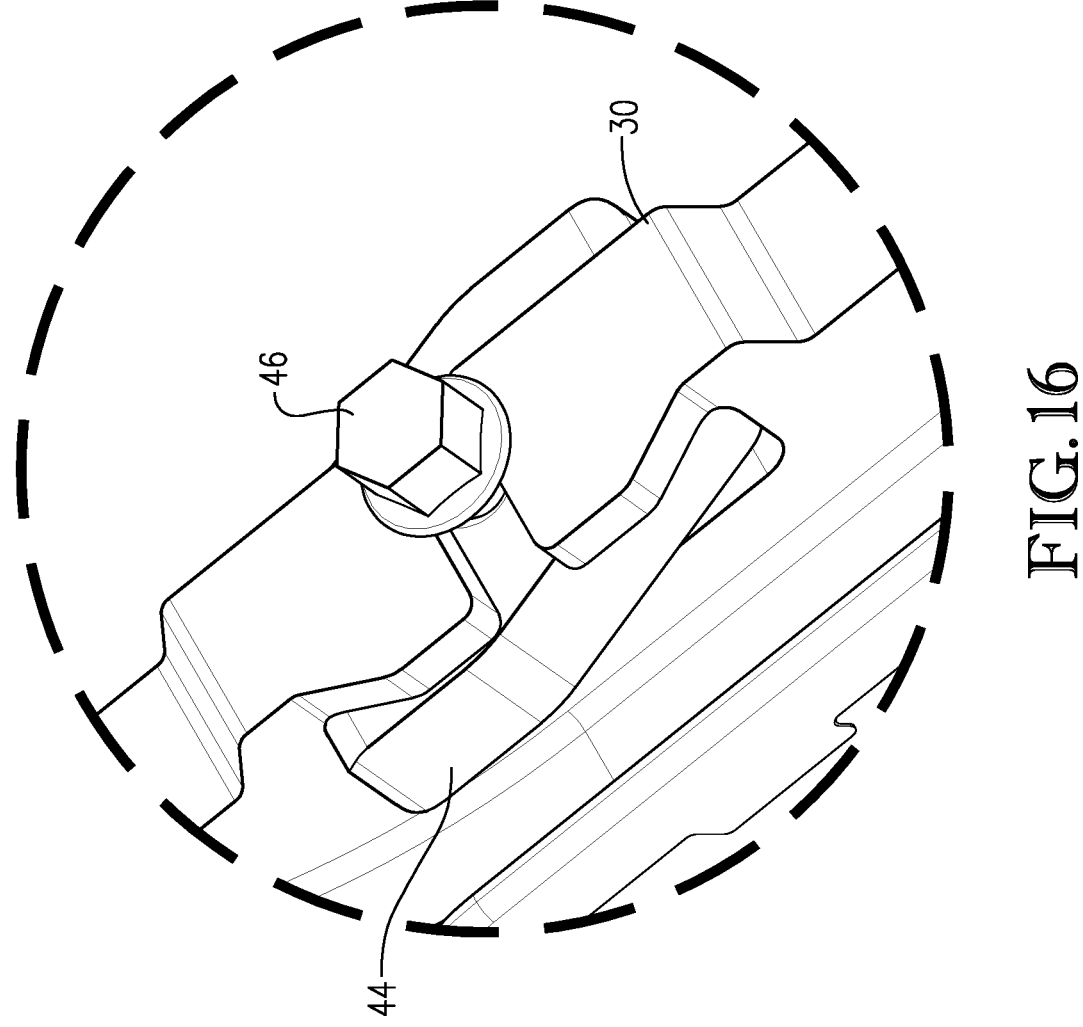
FIG. 16 depicts a close-up view of the circled section in FIG. 15.

Turning to FIG. 15, in various embodiments, the carriage frame 30 may contain a plurality of adjustable mold centering mechanisms 44 for centering and positioning the production mold while in the carriage frame 30. The adjustable mold centering mechanism 44 can account for various widths and depths of the production molds. As shown in FIG. 16, the carriage frame 30 includes mold centering mechanism 44, which may be secured using an adjustment bolt 46. Depending on the thickness and width of the production mold, the mold centering mechanism 44 may be slid in or out of the carriage frame 30.

Figure 17:
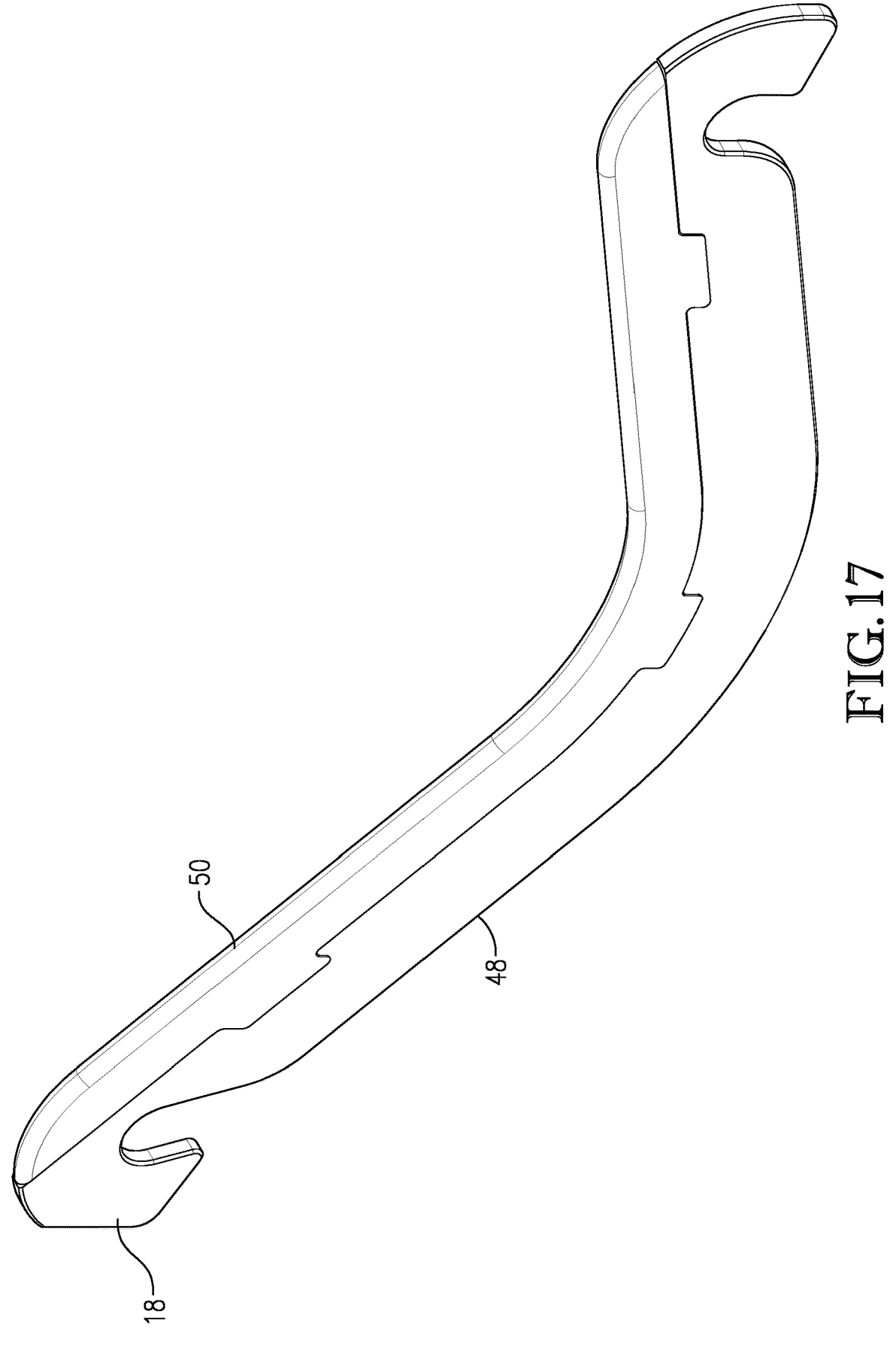
FIG. 17 depicts a reinforced gusset according to one embodiment of the present disclosure.

In one or more embodiments, the gussets 18 may be reinforced so as to extend their durability. As shown in FIG. 17, the gussets 18 may be reinforced with a durable coating 48, which can be formed from any rigid material, including metal (e.g., stainless steel). The reinforcement may be applied to the surface that is not exposed and contacted to the production mold during the operation of the device. Generally, a lower friction metal and/or polymer is preferred to be present on the surface 50 configured to contact the mold.

Figure 18:
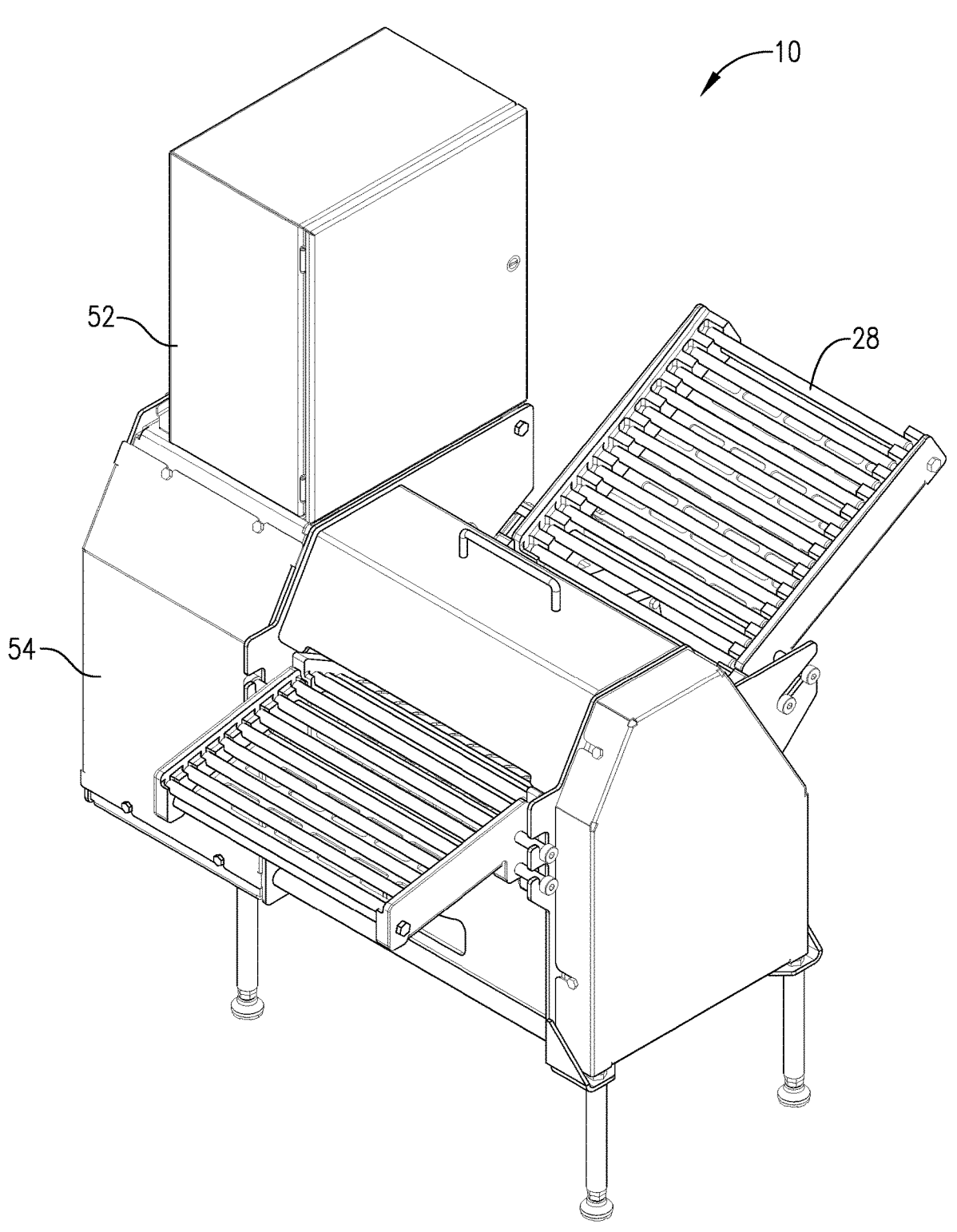
FIG. 18 depicts an exemplary demolding apparatus according to one embodiment of the present disclosure.

FIG. 18 depicts an exemplary demolding device 10 according to one embodiment of the present disclosure. As shown in FIG. 18, the device 10 can comprise a cabinet 52 for holding all of the necessary electronics of the device 10 and a drive enclosure 54 for housing the drive components and the aforementioned motors.

In one or more embodiments, a process for removing confectionaries from a production can be carried out using the demolding device described herein. Generally, this process can involve: (a) providing a production mold comprising a bottom side and a top side containing a plurality of filled cavities, wherein each of the filled cavities contain a confectionary; b) introducing at least a portion of the production mold into a demolding device, wherein the introducing comprises positioning the top side of the production mold onto at least one idle roller and a plurality of support gussets within the demolding device; (c) transferring the production mold through the demolding device via a drive roller, wherein the drive roller contacts at least a portion of the bottom side of the production mold; and (d) contacting a first agitator and a second agitator of the demolding device with at least a portion of the cavities within the production mold thereby removing the confectionary from within the cavities.

The production molds can be any type of mold commonly used in the food industry, such as silicone molds. In various embodiments, the molds are formed from a thermoset elastomer, such as silicone. Furthermore, the confectionary may comprise jelly candies, such as gummy candies.

During the process, and as previously discussed, the drive roller 12 may apply pressure to the back side of the production mold, thereby causing the production mold to bend along the support gussets. Furthermore, the applied pressure of the drive roller 12 may be adjustable based on the depth and sizes of the cavities within the production mold.

Reference numerals in FIGS. 1-18 may be summarized as follows:

10—Demolding device
12—Drive Roller
13—Drive Roller Shaft
14—First Agitator
16—Second Agitator
18—Guiding Gusset
20—Raised Roller Steps on Drive Roller
22—Production Mold
23—Cavities within Production Mold
24—Shaft for Agitators
26—Demolder Carriage
28—Idle Roller
30—Carriage frame
32—Drive Roller Mounting Mechanism
33—Demolder Device Frame
34—Agitator Shaft Mounting Mechanism
35—Collar within Agitators
36—Static Support Shafts
38—Alternative Mounting Mechanism for Agitator Shaft
40—Alternative Mounting Mechanism for Drive Roller
42—Locking Pin
43—Mounting Plate
44—Adjustable Mold Centering Mechanism
46—Adjustment Bolt
48—Gusset Reinforcement
50—Surface of Gusset for Contacting Mold
52—Cabinet
54—Drive Enclosure

Definitions

It should be understood that the following is not intended to be an exclusive list of defined terms. Other definitions may be provided in the foregoing description, such as, for example, when accompanying the use of a defined term in context.

As used herein, the terms "a," "an," and "the" mean one or more.

As used herein, the term "and/or," when used in a list of two or more items, means that any one of the listed items can be employed by itself or any combination of two or more of the listed items can be employed. For example, if a composition is described as containing components A, B, and/or C, the composition can contain A alone; B alone; C alone; A and B in combination; A and C in combination, B and C in combination; or A, B, and C in combination.

As used herein, the terms "comprising," "comprises," and "comprise" are open-ended transition terms used to transition from a subject recited before the term to one or more elements recited after the term, where the element or elements listed after the transition term are not necessarily the only elements that make up the subject.

As used herein, the terms "having," "has," and "have" have the same open-ended meaning as "comprising," "comprises," and "comprise" provided above.

As used herein, the terms "including," "include," and "included" have the same open-ended meaning as "comprising," "comprises," and "comprise" provided above.

As used herein, the term "jelly candies" refer to candies comprising sugar and at least one of starch, pectin, gum, or gelatin.

As used herein, the term "readily removable" refers to a component that can be removed from the device without disassembling another component in the device.

Numerical Ranges

The present description uses numerical ranges to quantify certain parameters relating to the invention. It should be understood that when numerical ranges are provided, such ranges are to be construed as providing literal support for claim limitations that only recite the lower value of the range as well as claim limitations that only recite the upper value of the range. For example, a disclosed numerical range of 10 to 100 provides literal support for a claim reciting "greater than 10" (with no upper bounds) and a claim reciting "less than 100" (with no lower bounds).

CLAIMS NOT LIMITED TO DISCLOSED EMBODIMENTS

The preferred forms of the invention described above are to be used as illustration only, and should not be used in a limiting sense to interpret the scope of the present invention. Modifications to the exemplary embodiments, set forth above, could be readily made by those skilled in the art without departing from the spirit of the present invention.

The inventors hereby state their intent to rely on the Doctrine of Equivalents to determine and assess the reasonably fair scope of the present invention as it pertains to any apparatus not materially departing from but outside the literal scope of the invention as set forth in the following claims.

What is claimed is:

1. A demolding device for removing confectionaries from a production mold, the device comprising:
(a) an angled carriage frame comprising a plurality of idle rollers configured to support a flexible production mold;

10

(b) a plurality of support gussets positioned in the carriage frame, wherein the support gussets are configured to position the flexible production mold at an angle of 20° to 70° while in the device;
(c) a drive roller positioned in the device above the carriage frame, wherein the drive roller is configured to apply pressure on the flexible production mold and facilitate movement of the flexible production mold through the device;
(d) a plurality of first agitators attached to a first shaft, wherein the first shaft is positioned in the device below the support gussets, wherein the first agitators comprise a plurality of first finger extensions configured to contact at least a portion of one or more cavities within the flexible production mold; and
(e) a plurality of second agitators attached to a second shaft, wherein the second shaft is positioned in the device below the support gussets, wherein the second agitators comprise a plurality of second finger extensions configured to contact at least a portion of the one or more cavities within the flexible production mold.

2. The device according to claim 1, wherein the drive roller comprises a plurality of raised steps configured to contact and apply pressure to the one or more cavities within the flexible production mold.

3. The device according to claim 1, wherein the drive roller, the gussets, the first agitators, and the second agitators are readily removable from the carriage frame.

4. The device according to claim 1, wherein the drive roller is operably connected to a motor thereby controlling the rotation speed of the drive roller.

5. The device according to claim 4, wherein the first shaft is operably connected to a second motor thereby controlling the rotation speed of the first shaft.

6. The device according to claim 5, wherein the second shaft is operably connected to a third motor thereby controlling the rotation speed of the second shaft.

7. The device according to claim 1, wherein the support gussets are formed from rigid polymer and the first agitators and the second agitators are formed from an elastomer.

8. The device according to claim 1, wherein the drive roller, the first shaft, and the second shaft are configured to control the depth of the first finger extensions and/or the second finger extensions into the one or more cavities of the production mold.

9. The device according to claim 1, wherein the angle of the support gussets is in the range of 30° to 60°.

10. A process for removing confectionaries from a production mold, the process comprising:
(a) providing a production mold comprising a bottom side and a top side containing a plurality of filled cavities, wherein each of the filled cavities contain a confectionary;
(b) introducing at least a portion of the production mold into a demolding device, wherein the demolding device comprises—
(i) an angled carriage frame comprising a plurality of idle rollers configured to support the production mold,
(ii) a plurality of support gussets positioned in the carriage frame, wherein the support gussets are configured to position the production mold at an angle of 20° to 70° while in the device,
(iii) a drive roller positioned in the device above the carriage frame, wherein the drive roller is configured to apply pressure on the production mold and facilitate movement of the production mold through the device, (iv) a plurality of first agitators attached to a first shaft, wherein the first shaft is positioned in the device below the support gussets, wherein the first agitators comprise a plurality of first finger extensions configured to contact at least a portion of the filled cavities within the production mold, and (v) a plurality of second agitators attached to a second shaft, wherein the second shaft is positioned in the device below the support gussets, wherein the second agitators comprise a plurality of second finger extensions configured to contact at least a portion of the filled cavities within the production mold;

(c) transferring the production mold through the demolding device via the drive roller, wherein the drive roller contacts at least a portion of the bottom side of the production mold; and (d) contacting the first agitators and the second agitators of the demolding device with at least a portion of the filled cavities within the production mold thereby removing the confectionary from within the filled cavities.

11. The process according to claim 10, wherein the introducing of step (b) comprises positioning the top side of the production mold onto at least one idle roller and the support gussets within the demolding device.

12. The process according to claim 10, wherein the confectionary comprises a jelly candy.

13. The process according to claim 10, wherein, during the transferring of step (c), the drive roller applies pressure to the back side of the production mold thereby causing the production mold to bend along the support gussets, wherein the applied pressure of the drive roller is adjustable.

14. The process according to claim 10, wherein the production mold is formed from a non-metallic material.

15. The process according to claim 10, wherein the first agitators and the second agitators are formed from an elastomer.

16. The process according to claim 10, wherein the first agitators and the second agitators rotate independently in configurable directions.

17. The process according to claim 10, wherein the drive roller comprises a plurality of raised steps configured to contact and apply pressure to the back side of the filled cavities within the production mold.

18. The process according to claim 10, wherein, during the transferring of step (c), the drive roller has a rotation rate of 5 to 100 rpm.

19. The process according to claim 10, wherein, during the transferring of step (c), the first agitators and the second agitators exhibit a Slaps Per Gummy (SPG) rate of 2 to 10.

20. A process for removing jelly candies from a production mold, the process comprising:

(a) providing a production mold comprising a bottom side and a top side containing a plurality of filled cavities, wherein each of the filled cavities contain a jelly candy;

(b) introducing at least a portion of the production mold into a demolding device, wherein the demolding device comprises—

(i) an angled carriage frame comprising a plurality of idle rollers configured to support the production mold, (ii) a plurality of support gussets positioned in the carriage frame, wherein the support gussets are configured to position the production mold at an angle of 30° to 60° while in the device, (iii) a drive roller positioned in the device above the carriage frame and connected to a first motor, wherein the drive roller is configured to apply pressure on the production mold and facilitate movement of the production mold through the device, (iv) a plurality of first agitators attached to a first shaft, wherein the first shaft is positioned in the device below the support gussets and is connected to a second motor, wherein the first agitators comprise a plurality of first finger extensions configured to contact at least a portion of the filled cavities within the production mold, and (v) a plurality of second agitators attached to a second shaft, wherein the second shaft is positioned in the device below the support gussets and is connected to a third motor, wherein the second agitators comprise a plurality of second finger extensions configured to contact at least a portion of the filled cavities within the production mold;

(c) transferring the production mold through the demolding device via the drive roller, wherein the drive roller contacts at least a portion of the bottom side of the production mold, wherein the drive roller has a rotation rate of 5 to 100 rpm; and (d) contacting the first agitators and the second agitators of the demolding device with at least a portion of the filled cavities within the production mold thereby removing the jelly candy from within the filled cavities, wherein the first agitators and the second agitators exhibit a Slaps Per Gummy (SPG) rate of 2 to 10.

* * * * *